3,449,400
PRODUCTION OF ACRYLONITRILE
Robert J. Evans, Jacksonville, Ill., and Keith M. Taylor, Ballwin, Mo., assignors to Monsanto Company, St. Louis, Mo., a corporation of Delaware
No Drawing. Filed Dec. 27, 1966, Ser. No. 604,605
Int. Cl. C07c *121/02, 121/32*
U.S. Cl. 260—465.9         9 Claims

ABSTRACT OF THE DISCLOSURE

Acrylonitrile is produced by a noncatalytic process from acetonitrile and a ketone or an aldehyde.

---

The present invention relates to a process for the production of acrylonitrile. More particularly, the present invention relates to a new and novel noncatalytic process for the direct synthesis of acrylonitrile from acetonitrile and a ketone or aldehyde.

Acrylonitrile is among the most valuable monomers available to the polymer industry for producing useful polymeric products. This valuable monomer is used in the preparation of synthetic fibers, synthetic rubbers and for other useful plastic products. Presently, most of the acrylonitrile is produced by such catalytic processes as the catalytic reaction of acetylene and hydrogen cyanide and the reaction of ammonia and propylene. While the known catalytic processes have proven very effective in producing acrylonitrile, the demand for acrylonitrile is so great as to make desirable the development of new and additional processes for producing acrylonitrile. Also, in general, the catalysts most often used in acrylonitrile production are relatively expensive in cost and handling. For these and other reasons, it would be advantageous to have means of producing acrylonitrile without the use of a catalyst.

It is an object of the present invention to provide a new and novel process for the preparation of acrylonitrile. Another object of the present invention is to provide a new and novel process for the preparation of acrylonitrile by a noncatalytic means. An additional object of the present invention is to provide a new and novel process for the production of acrylonitrile by the noncatalytic direct thermal reaction of acetonitrile with a ketone or aldehyde. Additional objects will become apparent from the following description of the invention herein disclosed.

The present invention, which fulfills these and other objects, is a process for the production of acrylonitrile which comprises subjecting acetonitrile and a compound selected from the group consisting of ketones and aldehydes to a temperature within the range of 700 to 1050° C. for a period of 0.1 to 20 seconds in the absence of a catalyst. By the process of the present invention significant quantities of acrylonitrile are produced. This acrylonitrile is produced without the aid of a catalyst. Since no catalyst is required, the present process results in a reduction of the expense required for catalyst purchase and handling. In addition, the present process provides significantly improved yields of acrylonitrile as compared with other similar thermal processes.

In order to further describe as well as to demonstrate the present invention, the following examples are presented. These examples are in no manner to be construed as limiting the present invention.

EXAMPLE I

A mixture of substantially equimolar quantities of acetonitrile and acetone was introduced concurrently with nitrogen into a reaction tube which was approximately 12 inches in length with an internal diameter of one inch. The nitrogen was present in a molar ratio to the combined acetonitrile-acetone of 1:1. A temperature of 800° C. was maintained within the reaction tube and the pressure was essentially atmospheric pressure. The residence time of the acetonitrile and acetone within the reaction zone was approximately 1 second. The effluent from the reaction zone was collected and found to contain 30% by weight of acrylonitrile.

EXAMPLE II

Example I was substantially repeated with the exception that the acetone to acetonitrile mol ratio was 1.5:1 and the residence time of the reactants within the reaction tube was 0.5 second. The reaction product effluent from the reaction zone was found to contain 41% by weight acrylonitrile.

EXAMPLE III

Example I was again substantially repeated with the exception that the mol ratio of acetone to acetonitrile was 1:2 and the residence time of the reactants within the reaction zone was 3 seconds. The reaction product effluent was found to contain 33% by weight acrylonitrile.

EXAMPLE IV

Example I was again substantially repeated with the exception that the mol ratio of acetone to acetonitrile was 7:3 and the residence time was 3 seconds. The reaction product effluent was found to contain 22% by weight acrylonitrile.

EXAMPLE V

Example I was repeated, the only difference in this run being that the reaction effluent product was analyzed for combined acrylonitrile and propionitrile. From this analysis it was found that approximately 52% by weight of combined acrylonitrile and propionitrile was present in the reaction product effluent.

EXAMPLE VI

Example I was substantially repeated with the exception that acetaldehyde was used instead of acetone and the residence time was 5 seconds. The reactor product effluent was found to contain 6% by weight of acrylonitrile.

From the above examples, it is readily apparent that the process of the present invention provides a means for producing very significant quantities of acrylonitrile and that such acrylonitrile may be produced without the aid of a catalyst.

Usually, the ketones and aldehydes employed in the process of the present invention are the aliphatic ketones and aldehydes having less than 20 carbon atoms though those having a greater number of carbon atoms may be employed if desired. The criticality of the molecular weight of the ketones and aldehydes is primarily a matter of convenience and practicality. As the molecular weight increases so does the expense of processing. More varied byproducts are produced with the higher molecular weight compounds thus presenting additional separations requirements for the recovery of the product acrylonitrile. The aliphatic radical of the ketones and aldehydes may be either straight chain or branched chain. As a practical matter, the ketones and aldehydes used in the process of the present invention are those having no greater than 6 carbon atoms per molecule. Included within this preferred group are such compounds as acetone, methyl ethyl ketone, methyl n-propyl ketone, methyl isopropyl ketone, diethyl ketone, hexanone-2, hexanone-3, formaldehyde, acetaldehyde, propionaldehyde, n-butyraldehyde, isobutyraldehyde, n-valeraldehyde, n-caproaldehyde, and the like. In the preferred practice of the present invention, the ketones most often are used in preference to the aldehydes. Among the particularly preferred ketones are acetone, methyl ethyl ketone, methyl n-propyl ketone and methyl isopropyl ketone.

In carrying out the process of the present invention, the acetonitrile and the ketone or aldehyde are generally employed in a mol ratio within the range of 20:1 to 1:20. The optimum mol ratio of reactants will vary to some extent with the molecular weight of the aldehyde or ketone. With the higher molecular weight ketones and aldehydes, lesser amounts of this reactant with respect to the acetonitrile may often be employed than may be employed when using the lower molecular weight ketones and aldehydes. In the preferred practice of the present invention, the mol ratio of acetonitrile to ketone or aldehyde is within the range of 5:1 to 1:5.

The temperatures at which the process of the present invention is operated, generally, are within the range of 750 to 1000° C. At temperatures below 750° C., reaction is below practical limitations. Above 1000° C., cracking of the reactants becomes excessive. Within the above defined temperature range, it has been found that the optimum reaction temperature decreases slightly with the increase in molecular weight of the ketone or aldehyde. In the preferred practice of the process of the present invention, temperatures within the range of 850 to 950° C. are most often used.

The pressure at which the process of the present invention is operated is not particularly critical and may be varied over wide ranges. The pressure may be subatmospheric, atmospheric or superatmospheric. Most often, the pressure at which the process of the present invention is operated will be within the range of 5 to 100 p.s.i.a. As a practical matter, the present invention is usually operated at or near atmospheric pressure, i.e., 14.5 to 20 p.s.i.a.

In operating the present process, the residence time of the acetonitrile and the ketone or aldehyde within the reaction zone most often is within the range of 0.1 to 20 seconds. The optimum residence time will vary according to temperatures, lower residence time being used with higher temperatures and conversely, longer residence time being used with lower temperatures. In the preferred practice of the process of the present invention, a residence time of 0.5 to 10 seconds is most often employed.

In carrying out the process of the present invention, it is often desirable to carry out the reaction of the acetonitrile and the ketone or aldehyde in the presence of a diluent. Such diluent is inert to the chemical reaction taking place within the reaction zone. Exemplary of materials which may be used as diluents are nitrogen, helium, argon, and the like. Among the preferred diluents are nitrogen and argon. When a diluent is used, it may be used in practically any concentration. However, as a practical matter, the diluent is most often present in a mol ratio of diluent to combined acetonitrile and ketone or aldehyde within the range of 4:1 to 1:4.

What is claimed is:
1. A process for the preparation of acrylonitrile which comprises subjecting acetonitrile and a compound selected from the group consisting of acetone, methyl ethyl ketone, methyl n-propyl ketone, methyl isopropyl ketone, diethyl ketone, hexanone-2, hexanone-3, formaldehyde, acetaldehyde, propionaldehyde, n-butyraldehyde, isobutyraldehyde, n-valeraldehyde and n-caproaldehyde, to a temperature within the range of 750 to 1000° C. for a period of 0.1 to 20 seconds in the absence of a catalyst.
2. The process of claim 1 wherein the ketone is acetone.
3. The process of claim 1 wherein the acetonitrile and the compound selected from the group consisting of ketones and aldehydes are in a molar ratio within the range of 20:1 to 1:20.
4. The process of claim 3 wherein said compound is acetone.
5. The process of claim 3 wherein said compound is acetaldehyde.
6. The process of claim 1 wherein the pressure within the reaction zone is within the range of 5 to 100 p.s.i.a.
7. The process of claim 1 wherein the temperature is within the range of 850 to 950° C.
8. The process of claim 1 wherein an inert diluent is introduced into the reaction zone concurrently with the acetonitrile and compound selected from the group consisting of ketones and aldehydes.
9. The process of claim 8 wherein the inert diluent is selected from the group consisting of nitrogen, helium and argon.

References Cited

UNITED STATES PATENTS 3,055,738   9/1962   Krebaum.

JOSEPH P. BRUST, *Primary Examiner.*

U.S. Cl. X.R.

260—465.1